Patented Nov. 17, 1931

1,832,109

UNITED STATES PATENT OFFICE

TALIAFERRO JAMES FAIRLEY, OF STERLINGTON, LOUISIANA, ASSIGNOR, BY DIRECT AND MESNE ASSIGNMENTS, OF ONE-HALF TO W. J. HUNTER AND ONE-HALF TO MARY P. HUNTER, BOTH OF SHREVEPORT, LOUISIANA

FOAM STABILIZER

No Drawing. Application filed May 21, 1928. Serial No. 279,604.

The present invention relates to foam stabilizers, and is primarily for use in solutions which, upon mixture in accordance with general practice, are capable of forming blankets of foam. These foam blankets are composed of carbon dioxide or from fumes which are nonsupporting to combustion. The reaction results in numerous gas bubbles, providing a blanket which will shut off the supply of oxygen to a fire, and in this manner a very excellent fire extinguishing composition is produced.

A stabilizer is required in order to increase the toughness and tenacity of the foam in order that the blanket will be stable, and not easily disintegrated or broken. The theory of the stabilizer is that it will increase the surface tension of the water films, which surround the gas bubbles in the foam, so that in this manner a blanket substantially impenetrable to oxygen and other gases will be formed to smother the fire.

My improved stabilizer is broadly stated as acetate, and specifically the acetate of a metal, for example, pyrolignite of iron (ferrous acetate), aluminum acetate, calcium acetate, copper acetates, ferric acetate, lead acetates, potassium acetate, magnesium acetate, sodium acetate, and titanium acetate. In other words, I can employ acetates of the heavy metals or the lighter metals, as well as acetates of the alkali earths and alkali earth metals.

These acetates may be formed in accordance with generally known methods, and may be in solution, or in dry form.

In carrying out my invention, I shall describe the use and preparation of pyrolignite of iron, known as ferrous acetate, although it will be understood that the ferrous acetate formed in other ways well known, may be employed.

In the destructive distillation of wood, and by that, I mean, hard woods, soft woods and resinous woods, and including the stumps, as well as the bodies of trees and roots, there results an acid water which, in many instances, is wasted. This acid water is usually decanted or withdrawn in order that the distillation may proceed successfully with respect to the other fractions of the distillate.

The acid water is generally termed pyroligneous acid or wood vinegar, and generally contains from 5 to 7% more or less of crude acetic acid.

I have found that scrap iron, filings, turnings and miscellaneous matter, such as nails, as well as raw and pure iron are readily soluble in this acid waste water. Steel is soluble to some extent, but is slow and I prefer not to use it in this connection, although it can be used if necessary.

There results a solution of ferrous acetate, and this solution may be used in that form or it may be suitably concentrated to a thick or syrupy liquid, or it may be dried to a fine powder or cake.

It will be understood that the degree of concentration will necessarily depend upon the amount and quantity of acetic acid, as well as upon the quantity of iron, which is dissolved.

The resulting product, whether it be the solution as formed, the concentrated liquid of thick form, or the dry powder can then be readily employed with the usual foam producing solutions, which are generally bi-carbonate of soda and aluminum sulphate, usually arranged in separate compartments in the fire extinguishing apparatus.

It will be clear that the solution may have an acid reaction which would be objectionable and, therefore, I find it advisable to neutralize the solution by means of a suitable alkali. For this purpose, bi-carbonate of soda, sodium hydroxide, or calcium and sodium carbonates may be employed, and in fact any suitable alkali, preferably one of the alkali earth or alkali earth metal series, since these will assist in production of the foam if they are in excess.

The neutral solution so formed is then added to the alkali chamber of the extinguisher, which contains the bi-carbonate of soda solution. I can, of course, add it to the acid chamber, but this may entail some difficulty, unless the solution is absolutely neutral without any trace of alkaline tendencies.

The same treatment would be necessary with concentrated solutions of the pyrolignite of iron, and in connection with the dried powder or cake mass, I preferably dissolve this in water and neutralize the solution, if necessary. It will be understood that in referring to the concentrated or dry preparations, this is done primarily for convenience in handling and shipping, although, obviously, the more concentrated the compound, the more effective will be the result.

In connection with the other acetates, above listed, I follow a similar procedure in order that no reaction may take place within the acid or alkali chambers containing the foam solutions and to which the particular acetates are added as the stabilizer. It is clear that in some cases, it may be necessary to neutralize the solutions with an acid as where they are of a basic nature and not suitable for use with the bi-carbonate of soda, or other alkali solution of the extinguisher.

I have observed with the use of my stabilizer, that a blanket of great tenacity is formed, and by reason of the presence of the metals, such blanket is heavy as well as firm, and the blanket formed is exceptional. It is impenetrable to oxygen and in actual use in connection with oil fires, as well as fires which are frequent in wood distillation and treating plants, the results have been highly satisfactory. These two problems where the inflammable matter is difficult to extinguish with water are probably as severe tests as can be applied for this invention.

Where the foam is sprayed, after the extinguishment of the fire, a crust or film is formed which, when dry, may be readily brushed off without leaving the usual stain. This is very important, because where the material comes in contact with walls and furniture, as well as other articles having a valuable finish, the present destructive action of foams will be eliminated.

What I claim is:

1. A fire extinguishing charge consisting of two solutions adapted to unite to produce fumes non-supporting to combustion, one of said solutions having mixed therewith pyrolignite of iron.

2. A fire extinguishing charge consisting of two solutions adapted to unite to produce fumes non-supporting to combustion, one of said solutions having mixed therewith neutralized pyrolignite of iron.

3. The process of extinguishing fires, which comprises presenting to the burning area a foam producing solution one of the members of which is a metal acetate.

4. The process of extinguishing fires, which comprises presenting to the burning area a foam producing solution one of the members of which comprises an acetate obtained by acting upon a metal with the acid waters obtained from the destructive distillation of wood.

In testimony whereof I have hereunto set my hand.

TALIAFERRO JAMES FAIRLEY.